Jan. 30, 1968     O. MUSGRAVE     3,365,984
DIFFERENTIAL UNIT

Filed March 11, 1965     5 Sheets-Sheet 1

INVENTOR
ORLY MUSGRAVE
BY Toulmin & Toulmin
ATTORNEYS

Jan. 30, 1968  O. MUSGRAVE  3,365,984
DIFFERENTIAL UNIT
Filed March 11, 1965  5 Sheets-Sheet 3
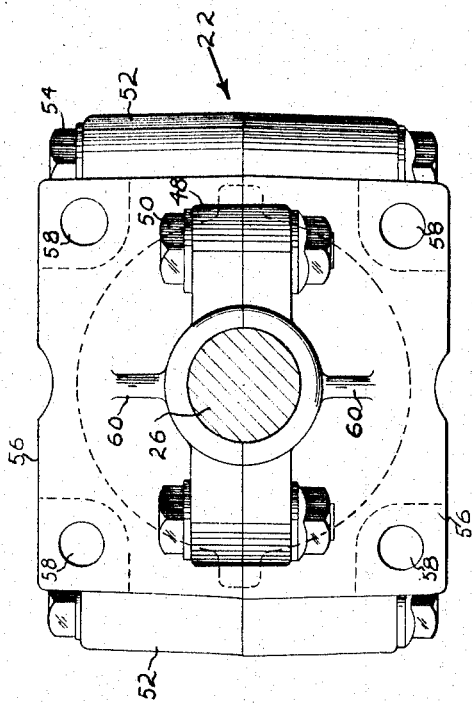
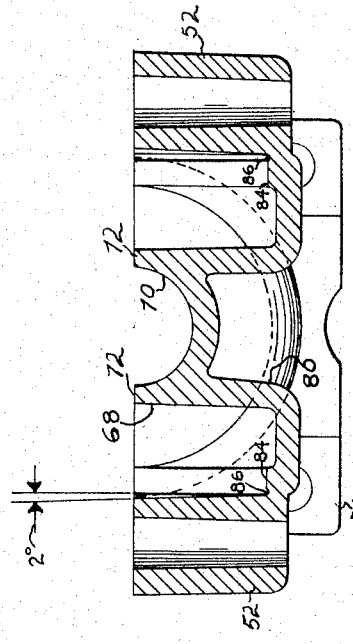
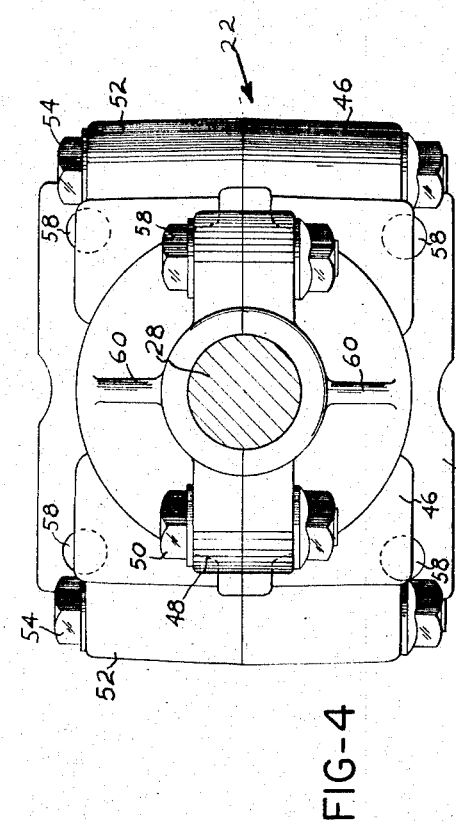
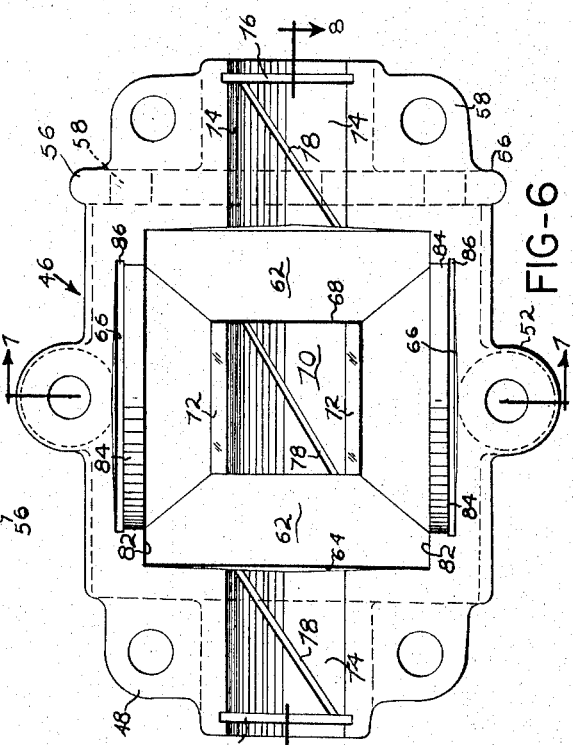
INVENTOR
ORLY MUSGRAVE
BY Toulmin & Toulmin
ATTORNEYS

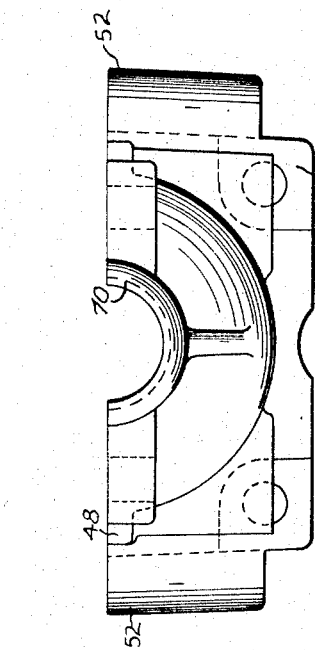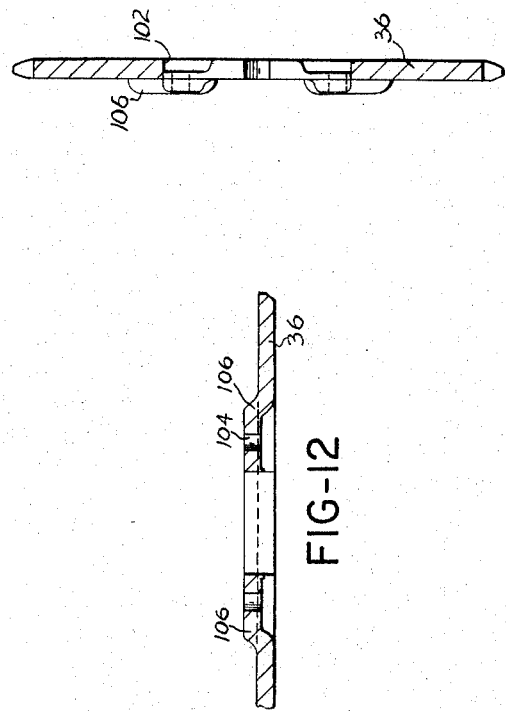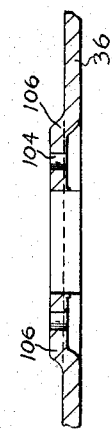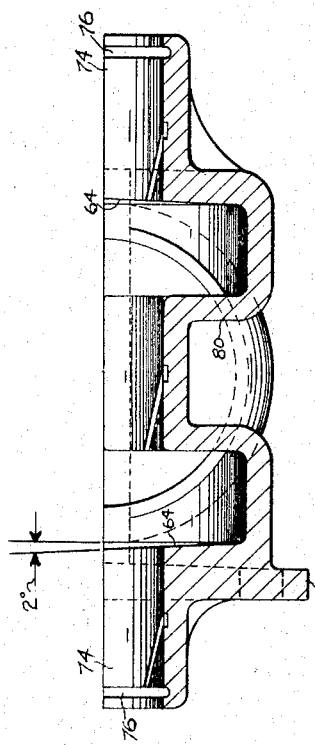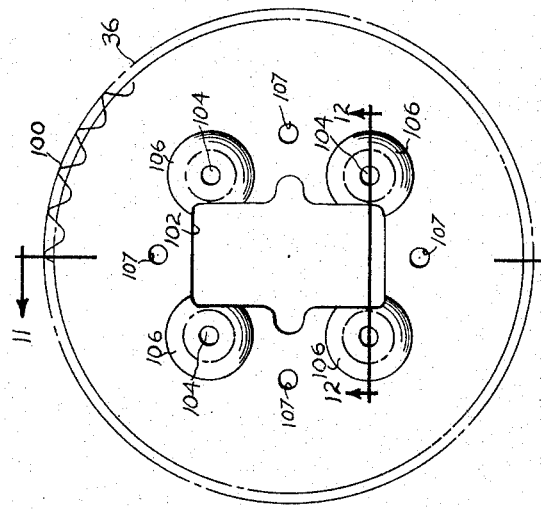

United States Patent Office 3,365,984
Patented Jan. 30, 1968

3,365,984
DIFFERENTIAL UNIT
Orly Musgrave, Springfield, Ohio, assignor to Mast-Foos Manufacturing Company Inc., Springfield, Ohio, a corporation of Ohio
Filed Mar. 11, 1965, Ser. No. 438,888
13 Claims. (Cl. 74—713)

This invention relates to a differential unit and more particularly to a differential unit which is especially adaptable for rider self-propelled vehicles, such as lawn mowers and the like.

In an effort to reduce the manufacturing costs of differentials used in the above type vehicles, applicant has discovered a novel construction which produces a low cost differential unit.

The unit consists of a housing made up of identical half sections which unit has openings on opposed sides thereof. Suitable wheel driving shafts are rotatably mounted in the openings in the housing and a novel gear arrangement is included therein. Applicant has discovered a novel way of supporting some of the gears in the housing to simplify the differential construction.

The improvement basically consists of rotatably supporting some of the gear members on their outside peripheries instead of the usual method of supporting gears on a shaft.

A primary object of this invention is to produce an inexpensive differential unit which has a minimum of parts.

Another object of this invention is to combine a novel differential unit with a brake system.

A further object of this invention is to produce an inexpensive differential unit in which some of the gears in the unit are supported for rotation on their outside peripheries instead of being mounted on a shaft.

These and other objects and advantages will become apparent from the following detailed description and accompanying drawings in which:

FIGURE 4 is an end view of the differential unit looking from the direction of A of FIGURE 2;

FIGURE 5 is an end view of the differential unit looking from the direction of B of FIGURE 2;

FIGURE 6 is a plan view of the differential housing looking into the cavity therein;

FIGURE 7 is a cross sectional view taken along the lines 7—7 of FIGURE 6;

FIGURE 8 is a cross sectional view taken along the lines 8—8 of FIGURE 6;

FIGURE 9 is an end view of the housing looking from the direction C of FIGURE 6;

FIGURE 10 is a plan view of the sprocket which drives the differential unit;

FIGURE 11 is a cross sectional view taken along lines 11—11 of FIGURE 10;

FIGURE 12 is a cross sectional view taken along lines 12—12 of FIGURE 10;

Figure 1:
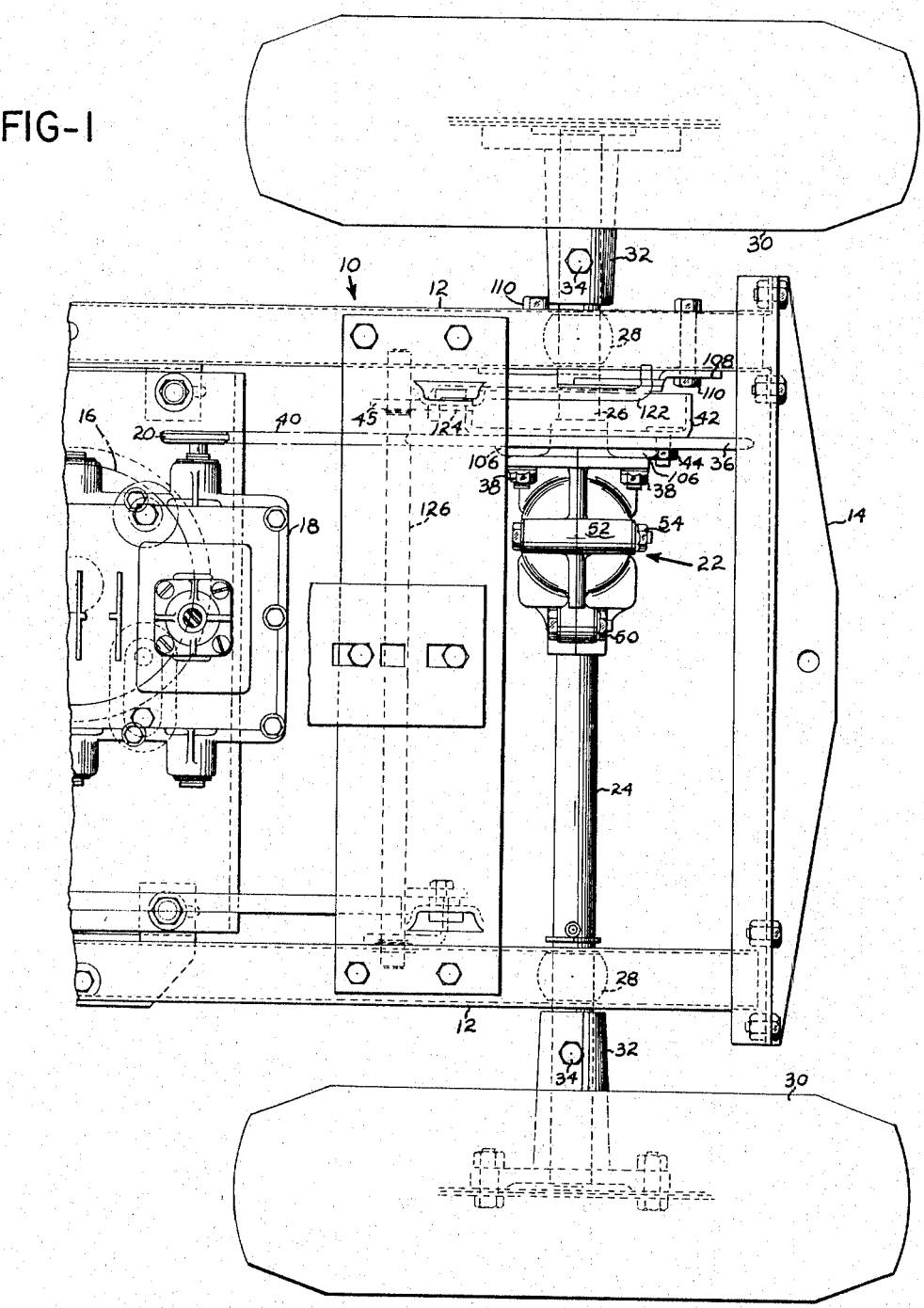
FIGURE 1 shows the differential unit of this invention in a typical application and is shown in a rider, self-propelled lawn mower of which only a portion is shown in a plan view.

Referring to the drawings more in detail, FIGURE 1 shows a plan view of a portion of a self-propelled rider vehicle, such as a power lawn mower, in which the differential unit of this invention is incorporated. The vehicle generally designated 10 has side frame members 12 and a rear cross member 14 suitably secured thereto as shown.

A prime mover 16, such as an internal combustion engine, is shown schematically operatively connected to a transmission unit 18, which is also schematically shown. Extending from the transmission unit is a drive sprocket 20 which is used to deliver the driving torque to the differential unit of this invention, generally designated 22. The unit 22 has wheel driving shafts 24 and 26 extending from opposite sides thereof, and these shafts are suitably mounted in known bushings 28 which are secured to the frame members 12 in known manner.

Each of the tires 30 has a standard driving hub means 32 which is secured to the related shaft by suitable fastener means 34. A driven sprocket 36 is secured to the differential unit 22 by suitable fasteners 38 and a driving chain 40 operatively connects drive sprocket 20 with driven sprocket 36 on the differential unit 22.

A circular brake drum 42 is secured to the driven sprocket 36 by suitable fasteners 44, and the brake linkage system generally designated 45 is operatively connected to the brake drum for braking said wheels. The brake system 45 will be later discussed in detail.

FIGURES 2–5 show details of the differential unit 22. The housing for the differential unit is made up of identical half sections 46 which are die cast sections secured together to form the housing. The sections 46 have flanges 48 on the corners thereof and the flanges are secured together by suitable fastener means 50. On the side of the housing there are bosses 52 which have holes therein to receive suitable fasteners 54 as shown. Since the joining faces of the identical half sections 46 are extremely flat, gasket means therebetween are not necessary.

Figure 2:
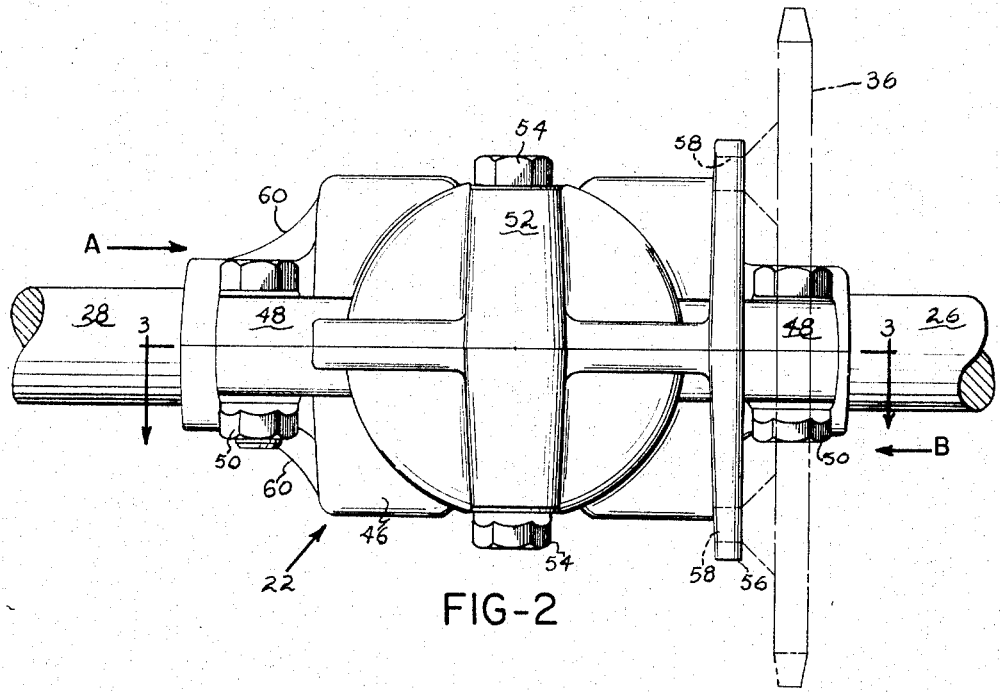
FIGURE 2 is an enlarged side view of the differential unit of this invention.

One end of the housing has a flange member 56 with holes 58 therein to receive the fasteners 38 for securing the sprocket 36 to the housing as shown in FIGURE 1. FIGURE 2 shows the sprocket 36 in phantom outline and in position adjacent to the flange member 56. There are suitable gussets or fillets 60 to reinforce the various sections of the housing as shown.

FIGURES 6–9 show details of the individual section halves 46. FIGURE 6 shows a plan view of one of these sections and from this view, the section is seen to have a generally quadri-laterally shaped cavity 62 with pairs of opposed sides 64 and 66.

Upstanding from the center of the cavity is a bearing block member 68 which has a semi-circular groove 70 therein to receive the inner ends of the wheel shafts. The bearing block member 68 has top faces 72 which engage each other when both section halves are secured together to form the housing.

Each section half 46 has a pair of aligned grooves 74 which are semi-circular in cross section and in which the wheel shafts are also rotatably mounted. Near the outer end of the groove 74 there are recesses 76 which are present for the purpose of trapping dirt therein. There are suitable spirally shaped lubrication grooves 78 present in groove 70 and grooves 74. The outside of the section is indented at 80 to maintain a constant thickness for each section half.

It should be noted that when both sections 46 are secured together to form the housing the opposed surfaces 64 and 66 have a configuration which is conical in shape. This is obtained by providing a draft angle of approximately 2° as seen in FIGURES 7 and 8. These areas provide the bearing surfaces for the gears which will be explained hereinafter.

Each of the sections has an annular projection 82 providing an annular face 84 for rotatably supporting a gear on its outside periphery. This face 84, in conjunction with the bearing surface 66, provides an annular recess in which the gear is rotated.

A suitable annular groove 86 is cut, as shown, to provide clearance for the edge of the gear which will be installed in said annular recess.

Figure 3:
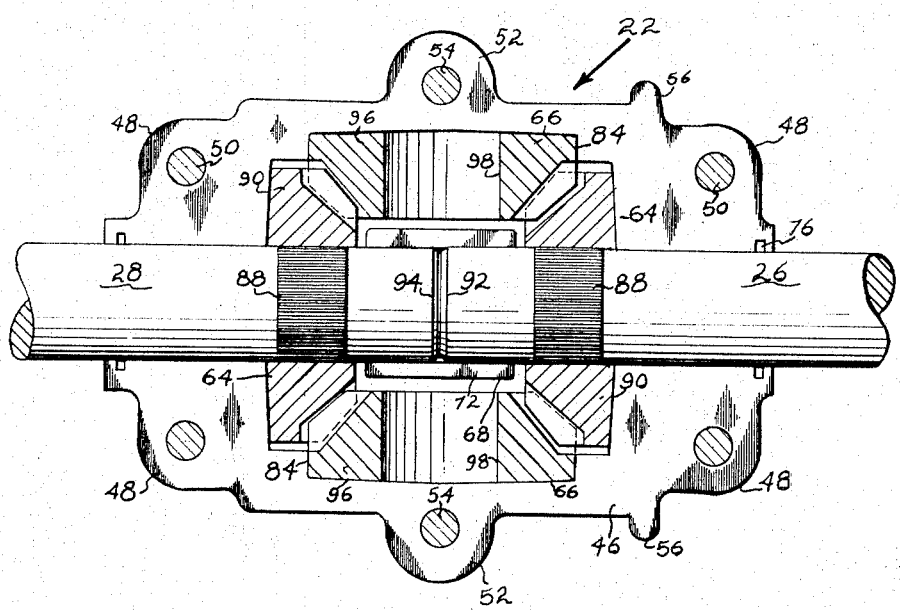
FIGURE 3 is a view of the differential unit taken along the lines 3—3 of FIGURE 2.

FIGURE 3 also shows the arrangement for positioning the various gears in the housing. The shafts 24 and 26 are provided with axially aligned knurls 88 and the bevel pinion gears 90 are pressed on the knurled sections to cut mating sections in the gears so that the gears 90 are fixed to rotate with their respective shafts. The inner ends 92 and 94 of the shafts 24 and 26, respectively, are in abutting engagement as shown and are supported in bearing blocks 68.

A pair of pinion gears 96 engage both of the gears 90 as shown in FIGURE 3. It should be noted that gears 90 are fixed to rotate with two respective shafts, while gears 96 are not rotated on any shafts. However, the gears 96 are rotatably supported on their peripheries in the annular recesses formed by faces 84 and the respective bearing surfaces 66. The side of the gear adjacent to its respective bearing surface also has a conically shaped configuration which is compatible to that of the bearing surface. The gears are made by powdered metal techniques with the said conical surfaces to eliminate machining and to provide a good bearing engagement. All of the gears used in this invention are identical; however, aperture 98 on gears 96 are not used since the gears are supported on their peripheries.

FIGURES 10–12 show details of the driven sprocket 36 used in conjunction with the differential unit. The sprocket is circular in shape and has teeth 100 on the perimeter thereof. The sprocket also has a generally rectangular aperture 102 therein and holes 104 through which fasteners 38 pass to attach the sprocket to flange member 56.

It should be noted that a portion of the housing and one of the drive shafts pass through the aperture 102 as shown in FIGURE 1.

The sprocket 36 is also provided with four projections or embossments 106 which are used to conveniently space the sprocket from the flange member 56. This spacing eliminates the need for machining the flange member.

In assembling the differential unit the gears 90 are fixed to their respective shafts as previously mentioned, and the pinion gears 96 are positioned between the gears 90, and the combination is inserted into the cavity 62 as shown in FIGURE 3. Both sections are secured together by fastening means as previously stated.

The housing sections of this invention have been made from an aluminum die casting; however, it is understood that other materials and methods of fabricating may be employed in the practice of this invention.

The pinion gears used in the embodiment of this invention have a pitch diameter of 2 inches and a pressure angle of 20 degrees with 20 teeth on each gear. The gears were made from powdered metal which was copper infiltrated and suitably compressed and heated by known powdered metallurgical techniques.

As was stated, the draft angles on the opposed pairs of surfaces 64 and 66 of each section 46 provide a conically shaped bearing surface when the sections are secured together. Since the gears are made from powdered metal, it was convenient to make the gear shape conical on the side which engages the respective bearing surface without machining to bring about an economy of production. In addition, the conical surfaces on both the housing and gears help to center the gears in the housing.

While the specific embodiment is shown as having two gears 96 included within the housing, it is understood that one of these gears could be eliminated and the differential unit would still operate. However, having two gears positioned as shown distributes the load among the gears more evenly.

Figures 13, 14:
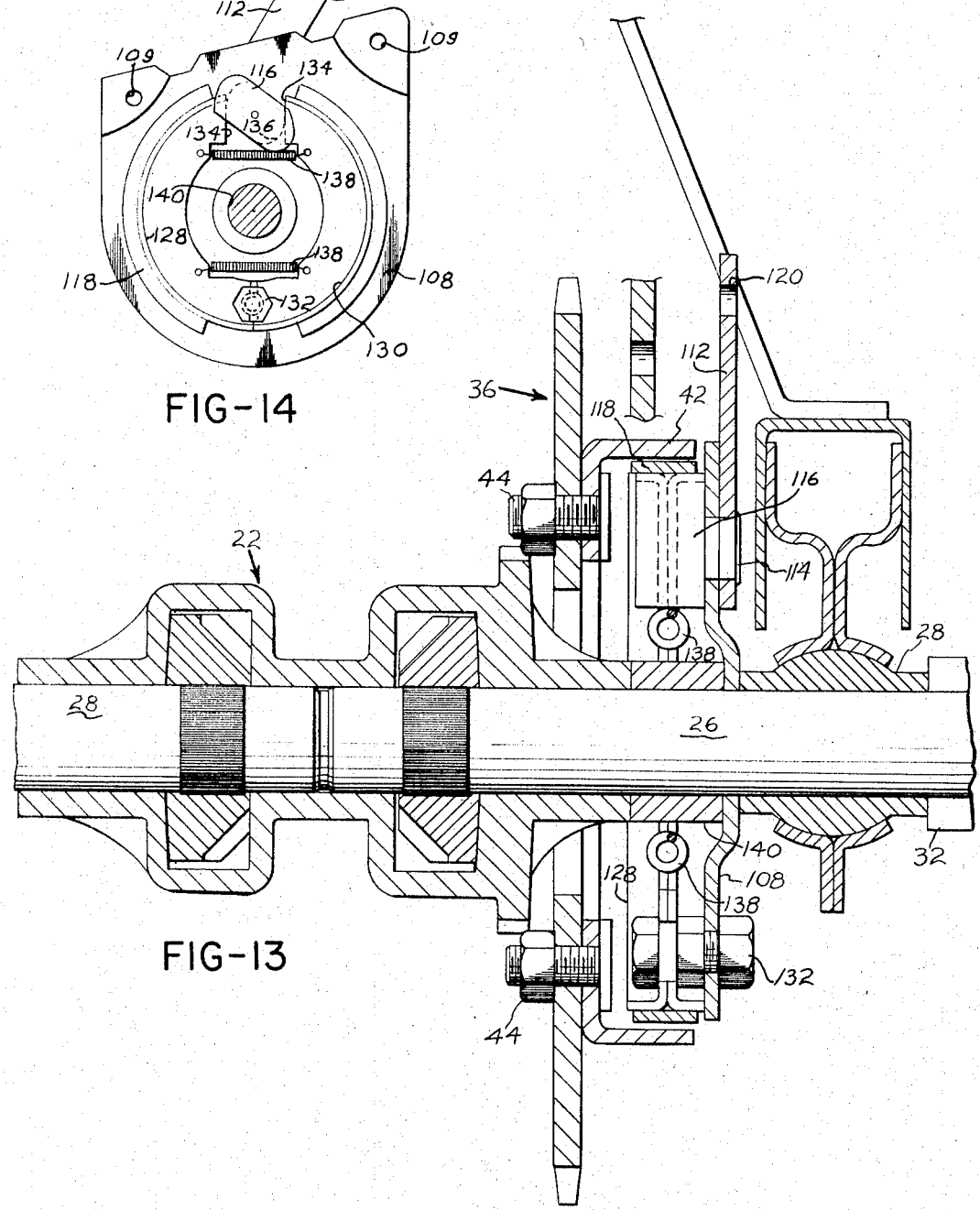
FIGURE 13 is an end view taken along line A of FIGURE 1 showing more details of the braking system coupled with the driven sprocket.
FIGURE 14 is a plan view of brake shoes on the mounting plate.

FIGURE 13 shows more details of the braking system which is operatively coupled to the driven sprocket 36 also shown in FIGURE 1. The brake drum 42 has a suitable aperture therein through which a portion of the differential unit 22 extends and the drum also has apertures in alignment with apertures 107 in driven sprocket 36 through which fasteners 44 pass to secure the sprocket and drum together.

A suitable brake shoe mounting plate 108 (better seen in FIGURE 14) has apertures 109 therein through which fasteners 110 pass to secure the plate to the frame as shown in FIGURE 1. An actuating lever 112 is pivotally joined to plate 108 by extension 114 which is fixed to cam member 116. When lever 112 is actuated, cam member 116 also is actuated and forces the brake shoes with linings 118 against the brake drum 42.

The upper end of lever 112 has an aperture 120 therein in which link member 122 is inserted to form a pivotal connection therebetween. The other end of link member 122 is pivotally joined to one end of a crank arm 124 which has the other end fixed to rotate with shaft 126 which in turn is pivotally mounted in side frame 12. The shaft 126 is operatively connected with a brake foot pedal (not shown) by known means.

FIGURE 14 shows the mounting of the brake shoes 128 and 130 on the mounting plate 108. The shoes are semi-circular in shape and are secured to the plate at the lower end by fastener means 132 which may also include known camming means to separate the lower ends to provide for brake adjustment as the lining 118 wears. The upper ends of the shoes are straight sections which engage the arcuately shaped faces 136 of the cam member 116.

As the lever 112 is pulled to the left as viewed in FIGURE 14, cam member 116 rotates therewith and pushes the shoes 128 and 130 outwardly against the brake drum 42. Suitable springs 138 pull the shoes together and away from the drum when the brake pedal is released.

The plate 108 has a suitable aperture 140 in which shaft 26 is inserted. A suitable spacing member 142 is used to locate the shoes in the drum 42 as shown in FIGURE 13.

It will be understood that this invention is susceptible to modification in order to adapt it to different usages and conditions and accordingly, it is desired to comprehend such modifications within this invention as may fall within the scope of the appended claims.

What is claimed is:

1. An apparatus comprising: a housing having oppositely disposed openings therein, coaxial driving shafts extending into said housing through said openings and rotatably mounted therein, a differential drive mechanism disposed within said housing and comprising a bevel gear mounted on each of said driving shafts for rotation therewith, at least one differentiating gear in mesh with said gears on said shafts, said housing having at least one cylindrical recess therein formed with a closed bottom and a generally cylindrical side wall seating said differentiating gear, said differentiating gear having a cylindrical periphery rotatably supported in said recess by said side wall.

2. An apparatus comprising: a housing having oppositely disposed openings therein, coaxial driving shafts extending into said housing through said openings and rotatably mounted therein, a differential drive mechanism disposed within said housing and comprising, a bevel gear mounted on each of said driving shafts for rotation therewith, a pair of differentiating bevel gears in mesh with said shaft mounted bevel gears, said housing having opposed cylindrical recesses therein, and said pair of differentiating bevel gears having peripheries rotatably supported in recesses, all said gears being substantially identical and the axes of rotation thereof lying in a common plane, said housing being made of identical half sections which are secured together, said housing also having drive means in connection therewith.

3. A differential unit comprising: a pair of identical sections adapted to be secured together to form a housing, said housing having a cavity therein with the sides thereof forming first and second pairs of opposed bearing surfaces, said housing also having aligned openings on opposed sides thereof in communication with said cavity with said openings being at substantially right angles to said first pair of bearing surfaces, coaxial driving shafts extending into said housing through said openings and rotatably mounted therein, a bevel gear mounted on each said shaft for rotation therewith in said cavity with each said gear being positioned in front of one of said surfaces of said first pair of bearing surfaces to restrain each gear against movement outward of said housing, a pair of opposed differentiating bevel gears in mesh with said first mentioned bevel gears, said housing having an annular projection formed in front of each surface of said second pair of bearing surfaces towards the center of said housing to form recesses, said differentiating bevel gears having peripheries supported by the sides of said recesses for rotation therein and being restrained against movement outward of said housing by said second pair of bearing surfaces, and means on said housing to rotate said housing about said shafts.

4. A low cost differential unit comprising: a pair of substantially identical half sections adapted to be secured together to form a housing, each section having a generally quadrilaterally shaped cavity therein with the sides thereof forming first and second pairs of opposed bearing surfaces, each section also having aligned grooves on opposed sides thereof extending into said cavity with said grooves being semi-circular in cross section and being at substantially right angles to said first pair of opposed bearing surfaces, said grooves forming openings on opposed sides of said housing when said sections are secured together, coaxial driving shafts extending into said housing through said openings and rotatably mounted therein, and a differential drive mechanism disposed within said housing and comprising, a bevel gear mounted on each said shaft for rotation therewith with said gears being restrained against movement outwardly of said housing by said first pair of opposed bearing surfaces, at least one differentiating bevel gear in mesh with said first mentioned bevel gears, said housing having at least one annular projection formed in front of one of the remaining bearing surfaces of said second pair to form a cylindrical recess therewith, said differentiating bevel gear having a periphery supported by the side wall of said recess for rotation therein and being restrained against movement outwardly of said housing by the related bearing surface of said second pair of surfaces.

5. A low cost differential unit comprising: a pair of substantially identical half sections adapted to be secured together to form a housing, each section having a generally quadrilaterally shaped cavity therein with the sides thereof forming first and second pairs of opposed bearing surfaces, each section also having aligned grooves on opposed sides thereof extending into said cavity with said grooves being semi-circular in cross section and being at substantially right angles to said first pair of opposed bearing surfaces, said grooves forming openings on opposed sides of said housing when said sections are secured together, co-axial driving shafts extending into said housing through said openings and rotatably mounted therein, bearing means in each said section to rotatably support the ends of said shafts in said housing, a bevel gear mounted on each said shaft for rotation therewith in said housing with said gears being restrained against movement outward of said housing by said first pair of opposed bearing surfaces, all said bearing surfaces being slightly conical in shape when said sections are secured together to center the related gear thereagainst, a pair of opposed differentiating bevel gears in mesh with said first mentioned bevel gears, said housing having an annular projection formed in front of each surface of said second pair of surfaces to form a recess therewith, each said differentiating bevel gear being supported on its periphery by one of said annular projections for rotation therein and being restrained against movement outwardly of said housing by the related bearing surface, all said gears being substantially identical in shape with the sides thereof adjacent to said bearing surfaces having a generally conical configuration complementary to that of said bearing surfaces.

6. The unit as claimed in claim 5 in which said housing has means thereon for rotating said housing about said shafts.

7. The unit as claimed in claim 6 in which said housing has an annular recess formed along the perimeter of each bearing surface of said second pair of surfaces and in which the axes of rotation of all adjacent said gears are at right angles to one another and lie in a common plane.

8. In a rider, self-propelled vehicle having a frame, a prime mover mounted on said frame and rear wheels operatively driven by said prime mover, the improvement consisting of a low cost differential unit comprising, a pair of identical half sections adapted to be secured together to form a housing, each section having a generally quadrilaterally shaped cavity therein with the sides thereof forming first and second pairs of opposed bearing surfaces, each section also having aligned grooves on opposed sides thereof extending into said cavity with said grooves being semi-circular in cross section and being at substantially right angles to said first pair of opposed bearing surfaces, said grooves forming openings on opposed sides of said housing when said sections are secured together, co-axial driving shafts extending into said housing through said openings and rotatably mounted therein, bearing means in each said section to rotatably support the ends of said shafts in said housing, a bevel gear mounted on each said shaft for rotation therewith in said housing with said gears being restrained against movement outward of said housing by said first pair of opposed bearing surfaces, all said bearing surfaces being slightly conical in shape when said sections are secured together to center the related gear thereagainst, a pair of opposed differentiating bevel gears in mesh with said first mentioned bevel gears, said housing having an annular projection formed in front of each surface of said second pair of surfaces to form a recess therewith, each said differentiating bevel gear being supported on its periphery by one of said annular projections for rotation therein and being restrained against movement outwardly of said housing by the related bearing surface, all said gears being substantially identical in shape with the sides thereof adjacent to said bearing surfaces having a generally conical configuration complementary to that of said bearing surfaces, said shafts also being rotatably supported in said frame with one of each said rear wheels being fixed to rotate with each said shaft, sprocket means secured to said housing to rotate said differential unit, and means operatively connecting said sprocket means to said prime mover.

9. In combination, a differential unit, a frame member, and brake means operatively connected between said frame and differential unit, said differential unit comprising, a housing having oppositely disposed openings therein, coaxial driving shafts extending into said housing through said openings and rotatably mounted therein, a differential drive mechanism disposed within said housing and comprising, a bevel gear mounted on each said driving shaft for rotation therewith, a pair of differentiating bevel gears in mesh with said gears on said shafts, said housing having opposed cylindrical recesses therein, said pair of differentiating bevel gears having peripheries rotatably supported in said recesses, sprocket means secured to said housing at right angles to said shafts and adapted to rotate said housing, said brake means comprising, a brake drum fixed to rotate with said sprocket means, mounting plate means secured to said frame and having brake shoe means pivotally secured to said mounting plate means and adapted to be brought into engagement with said brake drum, and link means to selectively move said brake shoe means to bring them into said engagement with said brake drum.

10. A differential unit including a rotatable housing having a cavity, opposing ends of which define a first pair of bearing surfaces and opposing sides of which define a second pair of bearing surfaces, a bevel gear seating to each respective bearing surface defining thereby opposing pairs of gears, each gear of a pair meshing with both gears of the other pair, the sides of said housing being recessed to define a projecting cylindrical side wall circumferentially of each of said second bearing surfaces, the bevel gears seating to said second bearing surfaces having a peripheral portion equal in diameter to the greatest diameter thereof in bearing contact with said cylindrical side wall, and opposing shafts entering said housing through the ends thereof, the bevel gears seating on said first bearing surfaces being mounted on to rotate with respective shafts.

11. A differential unit according to claim 10, characterized in that the said peripheral portion of each of the bevel gears seating on said second bearing surfaces terminating at one end in a toothed portion and at its other end in a transversely disposed back surface seating on a related one of said second bearing surfaces, said back surface and said peripheral portion having continuous bearing engagement in the respective recessed part of said housing with said toothed portion projecting therefrom.

12. A differential unit according to claim 11, characterized in that said peripheral portion of each of said bevel gears is cylindrical, said back surface and the related second bearing surface engaged thereby having mating conical configurations to make said gears self centering.

13. A differential unit including a rotatable generally rectangularly shaped housing having a cavity opposing ends of which define a first pair of slightly conical bearing surfaces and first opposing sides of which define a second pair of slightly conical bearing surfaces, a bevel gear seating to each respective bearing surface and defining opposing pairs of gears, each gear of a pair meshing with both gears of the other pair, all said gears being substantially identically constructed for interchangeable installation, each having a circular back surface to seat on a respective bearing surface, said back surface terminating at its periphery in a cylindrical portion representing a portion of maximum diameter of the gear, said cylindrical portion extending longitudinally from said back surface and terminating at an outer end in a bevel tooth formation, each of said gears having a through longitudinal opening therein, said housing being formed with a cylindrical wall in relative projecting peripherally surrounding relation to each of said second bearing surfaces, said wall providing a bearing surface to engage and support the said peripheral cylindrical portion of a related gear, the toothed portion of said gear projecting beyond said wall, and opposing shafts entering said housing through the ends thereof for relative rotary motion, said shafts being received in the through longitudinal opening of the gears seating to related first bearing surfaces and being fixed to said gears.

References Cited
UNITED STATES PATENTS

| | | | |
|---|---|---|---|
| 1,620,246 | 3/1927 | Walter | 74—711 |
| 2,292,578 | 8/1942 | McIntyre | 74—713 X |
| 2,346,175 | 4/1944 | Matson | 74—711 X |
| 2,716,461 | 8/1955 | MacPherson | 74—713 X |
| 3,002,401 | 10/1961 | Weir | 74—710.5 |

FRED C. MATTERN, Jr., *Primary Examiner.*

DAVID J. WILLIAMOWSKY, *Examiner.*

J. A. WONG, *Assistant Examiner.*